April 21, 1925.
F. N. JOHNSTON
AUTOMATIC AIR BRAKE CONTROL MECHANISM
Filed Nov. 5, 1924
1,534,217
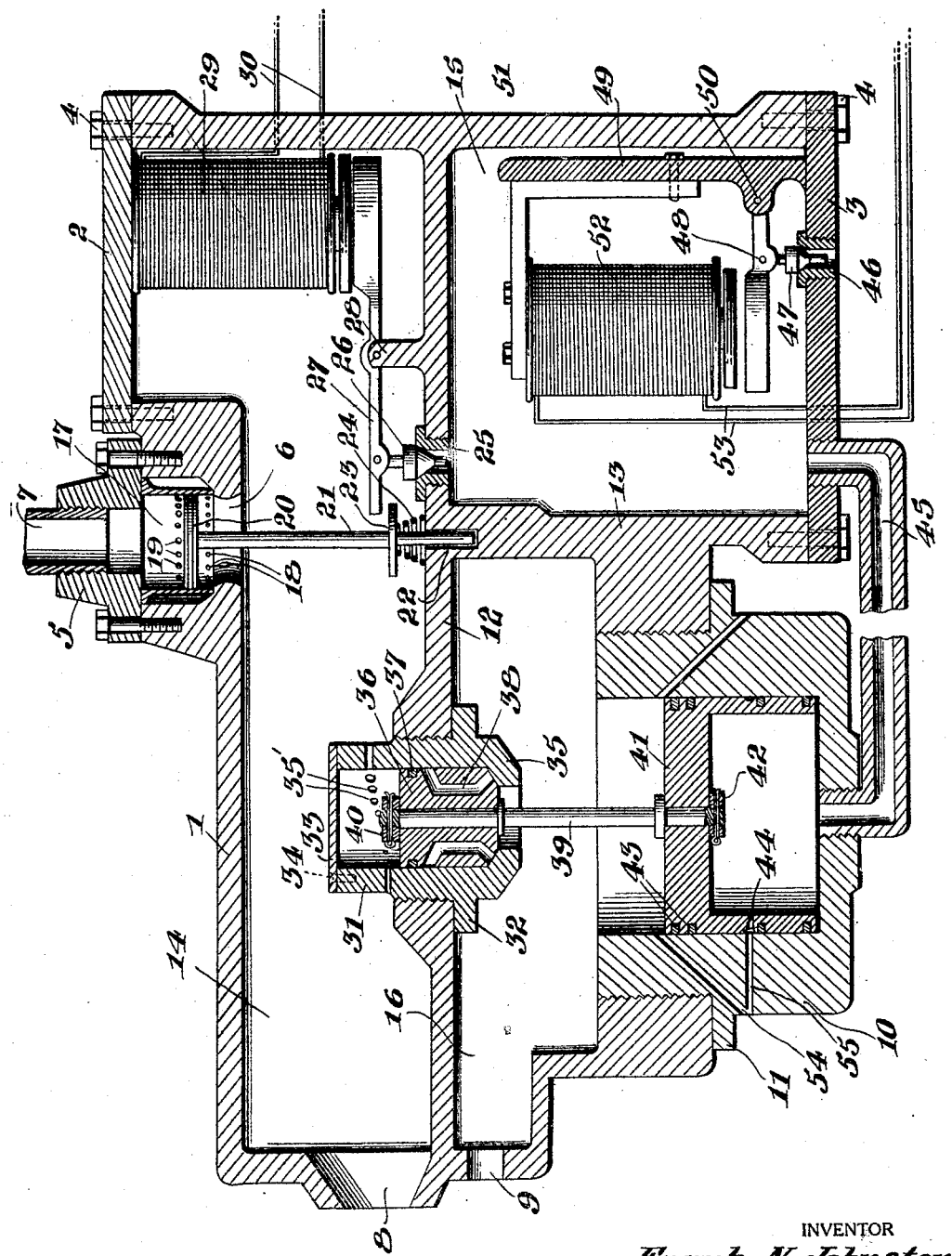
INVENTOR
Frank N. Johnston
BY
William C. Sinton
ATTORNEY Patented Apr. 21, 1925.

1,534,217

UNITED STATES PATENT OFFICE.

FRANK N. JOHNSTON, OF CHEYENNE, WYOMING, ASSIGNOR OF ONE-HALF TO C. Y. BEARD, OF CHEYENNE, WYOMING.

AUTOMATIC AIR-BRAKE-CONTROL MECHANISM.

Application filed November 5, 1924. Serial No. 747,930.

To all whom it may concern:

Be it known that I, FRANK N. JOHNSTON, a citizen of the United States of America, residing at Cheyenne, county of Laramie, State of Wyoming, have invented certain new and useful Improvements in Automatic Air-Brake-Control Mechanisms; and I do hereby declare that the following is a full, clear, concise, and exact description of the invention, such as will enable others skilled in the art to which it appertains to make and use the same.

This invention relates to improvements in automatic air brake control mechanisms such as are universally used in connection with railway rolling stock, the invention having for an object to provide certain improvements upon that type of control mechanism described and claimed in my United States Patent numbered 1,498,381, whereby the passage of compressed air therethrough into the air brake cylinders or into the train pipe line may be absolutely and automatically regulated to the required pressure to bring about an effectual braking operation.

It is also an object of the invention to provide the braking control mechanism with automatic mechanical means operable upon failure of the electrical valve actuating means to establish communication between the air reservoir chamber of the mechanism and those pressure operable means for the valve means controlling passage of air into the brake cylinder, whereby a braking operation will be positively effected.

Another and equally important object of the invention is to provide the apparatus with a novel form of regulating valve operable with the application of a requisite air pressure thereupon to establish communication between the air reservoir and the train pipe line and with the establishing of such communication, to maintain only the required pressure upon the braking cylinder or cylinders.

It is also among the aims and objects of the invention to provide the mechanism with means for positively preventing the so-called "leaking on" of the air brakes by reason of the accumulation, due to valve leakage, of air in the air reservoir or in the chamber receiving the pressure operable means of the regulating valve.

Other objects of the invention will be in part obvious, and in part pointed out hereinafter.

In order that the invention and its mode of operation may be readily understood by persons skilled in the art, I have in the accompanying illustrative drawing, and in the detailed following description based thereupon, set out one possible embodiment of the same.

In this drawing, I have shown a vertical longitudinal section through the improved air brake control mechanism.

Having more particular reference to the drawings, in connection with which like characters of reference will designate corresponding parts throughout, the improved air brake control valve mechanism may be stated to comprise a housing or casing generally indicated by the numeral 1, said housing being formed with openings in certain of its sides whereby to receive removable plates 2 and 3; these plates, in turn, being secured in their respective positions through the medium of bolts 4 or other suitable fastening devices. A nipple 5 is secured to one side of the housing 1 adjacent a port 6 therein and receives one end of the main air brake pipe line 7 therein, while a port 8 is formed in one side of the housing and is adapted to communicate, by way of a conduit or the like with an auxiliary air reservoir, not shown. Also, another port 9 is formed in that side of the housing 1 having the port 8 therein and is adapted to communicate with the air brake cylinder or cylinders of the mechanism to be controlled by and operated from the improved apparatus.

A screw threaded opening is formed in one side of the housing 1 and receives therein a cap-like cylinder 10, said cylinder being formed with an externally screw threaded extension and with a motion limiting flange 11 adapted, with turning of the screw threaded portion of said cap into engagement with the opening in the housing 1, to limit its extent of engagement with said housing as is clearly shown in the drawing. This cap-like cylinder 10, as will be noted, is provided with a cylindrical bore, the purpose of which will be subsequently described.

By means of longitudinally and transversely partitioned walls generally indicated by the numerals 12 and 13, the housing 1 is divided into a plurality of chambers to wit: an air reservoir chamber 14, an air pressure receiving chamber 15, and a pressure actuated means receiving chamber 16.

Disposed longitudinally of and arranged within the port 6 is a cylindrical sleeve 17 having a plurality of relatively spaced series of perforations 18 and 19 formed therein, while a piston 20 is snugly and slidably received within the cylindrical sleeve 17 and has a rod 21 extending therefrom, the free end of which engages in a pocket 22 formed in an adjacent portion of one of the partition walls, namely, 13. A disk 23 is fixedly mounted upon the lower portion of this piston rod 21 and is adapted to be engaged by the upper end of a helical spring 24, the lower portion of which has bearing upon an adjacent portion of the longitudinal partition wall 12, said spring normally exerting an upward thrust upon the disk 23 aforesaid.

With a view towards establishing and controlling communication between the pressure reservoir chamber 14 and the chamber 15, a port is formed in the partition wall 12 as between these two chambers and has a bushing or thimble 25 turned into engagement therewith, one end of which is formed with a bevelled valve seat adapted to receive a frusto-conical valve 26 therein, the upper end of the stem of this valve being connected to the adjacent end of an armature 27, the arm of which is pivotally mounted in suitable bearings, as indicated at 28, said armature being adapted, at times, to be drawn into contact with an electro-magnet 29 arranged within the chamber 14 and secured to a portion of the under side of the plate 2 as indicated in the drawing. Suitable electrical conductors 30 are extended from the winding of this electro-magnet 29 and are connected in a suitable electrical circuit, not shown herein. At this point, it may be noted that with energization of the electro-magnet 29, the armature 27 will assume that position as shown in the drawing, whereupon the frusto-conical valve 26 will engage upon its seat in the bushing 25 and thus serve to interrupt communication as between the chambers 14 and 15. However, with deenergization of the magnet 29, the magnet engaging portion of the armature 27 will drop away from the magnet 29 and in doing so, will disengage the frusto-conical valve 26 from its seat in or upon the bushing 25, thus establishing communication as between the pressure reservoir chamber 14 and the chamber 15.

A portion of a partition wall 12 dividing a chamber 14 from the chamber 16 is provided with an internally screw threaded opening receiving a cylindrical sleeve 31 therethrough, a portion of such sleeve being externally screw threaded while a flange 32 is formed thereon and serves to limit the extent of its engagement with the screw threaded opening aforesaid. The upper end of this cylindrical sleeve 31 is normally closed by means of a cap or cover plate 33 secured in position with respect to such end of the sleeve through the medium of a fastening screw or similar device 34. As will be noted, the lower end of the sleeve is constricted, as indicated at 35, while in the upper portion thereof there is formed a series of relatively graduated diagonally disposed ports generally indicated by the numeral 35', it being noted in this connection that these ports 35' establish communication as between the chamber 14 and the interior of the sleeve 31. Slidably received in the cylindrical sleeve 31 is a valve 36 provided with packing 37, said valve having substantially U-shaped ports 38 formed therein, certain of the ends of which open onto the peripheral portion of the valve, while the opposite ends open onto the reduced lower end of said valve as is shown in the drawings. A suitable stem 39 is provided, the valve 36 passing longitudinally therethrough and having its upper end locked against disengagement, as indicated at 40, the opposite end portion of said stem extending downwardly into engagement with a piston 41 slidably mounted in the cylindrical bore of the cap 10, as indicated at 42. This piston 41 is preferably provided with packing 43 for an obvious purpose, while a port 44 is formed in one side wall thereof for a purpose which will be subsequently described.

Communication between the chambers 15 and 16 is established by way of a pipe or conduit 45, the opposite ends of which are angularly bent and turned into engagement with suitably formed screw threaded openings in the bottom of the cap 10 and in the plate 3 as shown. Thus, it follows that with passage of air from the chamber 14 into the chamber 15, such air will pass from the chamber 15 by way of the pipe 45 into the cylindrical bore of the cap 10, exerting an upward pressure or thrust upon the piston 41 slidable therein.

At times, it is desired that the air directed into the chamber 15 from the reservoir chamber 14 shall be exhausted to the atmosphere and to accomplish this, a port is formed in the cover plate 3 of said chamber 15 and receives a suitable bushing or valve seat 46 therein, the upper end of which is normally engaged by a frusto-conical valve 47 whose stem is pivotally connected to the intermediate portion of an armature 48 pivoted, in turn, to a supporting bracket 49 rigidly mounted upon the cover plate 3 within the chamber 15, as indicated at 50. This bracket 49, in turn, has a right angularly bent arm 51 fixedly connected thereto carrying a dependent electro-magnet 52, the lower end of the pole of which is arranged in proximity to the armature 48. Electrical conductors 53 are extended from the opposite ends of the winding of the magnet 52 into engagement with a suitable electrical circuit not shown herein. Thus, with energization of the winding of the electromagnet 52, it will be understood that the armature 48 will be attracted into engagement therewith and in consequence, that the frusto-conical valve 47 will be withdrawn from the valve seat 46, thus permitting air within the chamber 15 to be exhausted to the atmosphere.

In order to prevent the so-called "leaking on" of the air brakes of a system equipped with the invention, I may and preferably do form diagonally disposed ducts 54 in the opposite sides of the cap 10, the inner ends of these ducts open onto the upper portion of the cylindrical bore within the cap 10 above the piston 41, while another duct 55 is formed in a portion of the cap 10 and is adapted to have the inner end thereof normally aligned with the port 44 formed in the piston 41. Since these ducts 54 and 55 open onto the outer side or peripheral portion of the cap 10, it will be understood that any air accumulating within the chamber 16 or underneath the piston 41 and flowing into the cylindrical bore of the cap 10 by way of the pipe 45, will be immediately exhausted therefrom and in consequence, will serve to prevent movement of the valve 36 as well as the passage of air from the chamber 16 through the port 9 into the brake or braking cylinders.

The modus operandi of the improved mechanism may be stated to be as follows:—

The mechanism is connected by way of the conduit 7 to the air line of the air braking system including the same and the normal pressure directed into the port 6 will be such as to force the piston 20 downwardly against the tension of the spring 24 and the pressure of air within the chamber 14 to that position as shown in the drawing, thus uncovering the several spaced series of ports 19 in the sleeve 17 and permitting communication to be established as between said conduit 7 and the chamber 14. The port 8 is, as hereinbefore stated, connected to a suitable auxiliary air reservoir not shown. The electro-magnet 29 is normally energized and thus causes the frusto-conical valve 26 connected to its armature 27 to normally remain in closed position. When, however, it is desired to apply the brake controlled by my invention, the electromagnet 29 is deenergized, thus permitting the valve 26 to be moved to its open position with respect to the bushing 25, setting up communication as between the chambers 14 and 15. The compressed air passing from the chamber 14 into the chamber 15 will then flow by way of the pipe 45 into the lower part of the cylindrical bore of the cap 10 exerting an upward thrust to the piston 41 slidable in said bore and by consequence, effecting upward movement of the valve 36 in the cylindrical sleeve, thereby bringing the upper ends of the U-shaped ports into communication with certain of the graduated diagonally disposed ports 35′ and permitting compressed air to pass through these ports 35′, the port 38, downwardly through the constricted and open lower end of the cylindrical sleeve 31 into the chamber 16 from whence it will pass by way of the port 9 into the air brake cylinder. With proper application of the brakes to release the same, the electro-magnet 29 is reenergized, thus closing the valve 26 with respect to the bushing 25 and the electromagnet 52 is then energized drawing the armature 48 into engagement therewith and in consequence, opening the valve 47 with respect to the valve 46. At this time, air in the chamber 15 and in the lower portion of the cylindrical bore of the cap 10 and the pipe 45 will be permitted to pass or exhaust into the atmosphere; thus, with release of pressure upon the piston 41, said piston will return to its lowermost and normal position within the cylindrical bore of the cap 10, disconnecting the ports 38 of the valve 36 from the ports 35′ in the cylindrical sleeve 31 and thereby preventing any further passage of compressed air from the reservoir chamber 14 into the chamber 16 and thence by way of the port 9 into the air brake cylinder attached or connected thereto.

It will be noted at this point that the leakage ducts 54 and 55 will prevent the so-called "leaking on" of the air brakes connected to the improved mechanism herein described. For instance, should there be any accumulation of air in the lower portion of the cylindrical portion of the bore of the cap 10 or in the chamber 16 by reason of faulty valve seating, such air will be immediately exhausted to the atmosphere by way of these ducts 54 and 55, it being borne in mind that the inner ends of the ducts 54 communicate with the cylindrical bore of the cap 10 above the normal positioning of the piston 41 and thus with the chamber 16, while the duct 55 communicates with the port 44 formed in one side wall of the piston 41. Thus, undesired or faulty operation of the brakes connected to the mechanism by way of the port 9 will be absolutely prevented.

Also, it is to be noted at this point that the air pressure applied to the brakes may be equalized. For example, should an operator of the mechanism desire a brake pressure of 25 pounds, all that would be necessary would be that he break the electric circuit included in the electro-magnet 29, thus deenergizing the same and permitting the valve 26 to be moved to its open position, whereupon air pressure to the extent of 25 pounds would be admitted to the chamber 15. When the desired pressure has been attained, the magnet 29 would be reenergized, thus closing the port 26 and interrupting communication as between the chamber 15 and the chamber 14. This pressure of 25 pounds would be sufficient to cause the piston 41 to rise, thus bringing the ports 38 of the valve 36 into contact with the ports 35′ in the cylindrical sleeve 31 and allowing air to pass from the reservoir chamber 14 into the chamber 16 and from thence to the ports 9 to the brake cylinder. If, for any reason, there should be a leak which would serve to lessen the pressure in the chamber 16 connected with the brake cylinder through the ports 9, the pressure in the chamber 19 and in the lower portion of the bore of the cap 10, that is, below the piston 41, would cause said piston 41 to raise the valve 36 and establish communication as between the chambers 14 and 16, whereupon air would pass from the former into the latter until the pressure in the chamber 16 was again restored to 25 pounds. Thus, it will be seen that an equalized or holding position is obtained. Furthermore, it is to be noted that the ports 35′ in the cylindrical sleeve 31 are of unequal size and are diagonally disposed or arranged with respect to said sleeve, that is, they are arranged in a varied line of height. All brake cylinders are not uniform. Some of them have a piston travel of four inches, some six inches, and still others eight inches. Each brake cylinder will assume the same amount of air pressure in the same lapse of time and at the first instant when the brake application is made, the piston 41 will move the valve 36 upwardly to its extreme open or top position, allowing the compressed air to flow through all of the ports 35′ into the ports 38 and from thence into the chamber 16. However, as the time of application of the brakes begin, the brake cylinder with the four inch piston travel will cause the pressure in the chamber 16 to increase faster than it would with a brake cylinder having a six inch or an eight inch piston travel. Since, however, the ports 35′ are graduated in size and are at variable heights or diagonal relationship with respect to the cylindrical sleeve 31, it will be seen that as the pressure increases on the upper side of the piston 41, it will cause the same to be forced downwardly more rapidly in the case of the brake cylinder with the four inch piston travel than it would on the brake cylinder having a six inch or an eight inch piston travel. Therefore, it will be understood that as the pressure in the chamber 15 and the pressure in the lower portion of the cylindrical bore of the cap 10 below the piston 41 remains constant, the difference in travel of the various brake cylinder pistons connected to the mechanism is taken care of by keeping a pressure of air in the chamber 16 uniform.

In event that any of the electrical conductors 30 or 53 connected to the electromagnets 29 or 52 become broken or there is any failure of the electrical circuit including the same, it is to be understood that a full application of the air brake would be made, since the electro-magnet 29 would be deenergized by such failure of electrical circuit thereby causing air to pass from the chamber 14 into the chamber 15 through the conduit 45 into the lower portion of the cylindrical bore of the cap 10, thus raising the valve 41 and establishing communication as between the chamber 14 and the chamber 16 by way of the valve 36. At the same time, the deenergization of the electromagnet 52 which is its normal condition, would cause the frusto-conical valve 47 to remain in its closed position, thus preventing the escape of air from the chamber 15 into the atmosphere.

Should, for any reason, the train pipe line connected by way of the conduit 7 to the port 6 become broken and permit the escape of air pressure to the atmosphere, then the pressure of air in the chamber 16 from the auxiliary air tank connected to the port 8 would be sufficient to exert an upward thrust to the piston 18, thereby moving the same to its uppermost position above the uppermost series of circular ports 19, hence, interrupting communication as between said conduit 7 and the chamber 14. Also, at this point, it should be stated that the disk 23 arranged upon the piston rod 21 would, with upward movement of said rod, contact with the adjacent end of the armature 27, thereby moving the same upwardly and permitting communication to be established as between the reservoir chamber 14 and the chamber 15, allowing air to pass from the chamber 15 by way of the conduit 45 into engagement with the piston 41 and operating said piston so as to establish communication between the chambers 14 and 16 whereby to effect application of the air brake cylinder or cylinders connected to the port 9. In this connection, it is to be noted that the lower series of ports 19 formed in the sleeve 17 is smaller than the upper series of ports and in consequence, they will serve to restrict the passage of air therethrough with raising of the piston 18, thus facilitating upward movement of said piston 18 to its uppermost position whereat both sets of ports will be closed and communication between the conduit 7 and the port 6 interrupted.

Manifestly, the construction shown is capable of considerable modification and such modification as is within the scope of my claims I consider within the spirit of my invention.

I claim:—

1. In an air brake control mechanism, a housing interposed between the train pipe line and the air brake mechanism, said housing being divided into a plurality of chambers, valve means between certain of said chambers for controlling communication therebetween, other valve means arranged between certain others of the chambers for controlling the passage of air from one of said chambers into the other and to the air brake mechanism, and pressure actuated means in said last mentioned chamber connected to the last mentioned valve means for effecting operation thereof.

2. In an air brake control mechanism, a housing interposed between the train pipe line and the air brake mechanism divided into a plurality of chambers, automatically operable valve means between certain of said chambers for controlling communication therebetween, other valve means arranged between certain others of the chambers for controlling the passage of air from one of these chambers into the other and from the latter chamber into the air brake mechanism, and pressure operable means in said last mentioned chamber communicable with another of the chambers for effecting movement of said last mentioned valve means to its opened and closed positions.

3. In an air brake mechanism, a housing interposed between the train pipe line and the air brake mechanism divided into a plurality of chambers, electrically operable valve means for controlling communication between certain of said chambers, automatic mechanical valve means arranged between certain others of the chambers for establishing communication therebetween whereby to permit the passage of air from one of these chambers to the other and to the air brake mechanism, and pressure operable means in said other chamber communicable with another of the chambers for effecting movement of said last mentioned valve means as and for the purpose set forth.

4. In air brake mechanism, a housing interposed in the train pipe line and adjacent the air brake mechanism, said housing being divided into a plurality of chambers, automatically operable valve means for controlling communication between certain of said chambers, other automatically operable valve means between certain others of said chambers for controlling communication therebetween to permit the flow of air from one into the other and to the air brake mechanism, pressure operable means communicating with said other chamber and with one of said first mentioned chambers for transmitting motion to said other automatic valve means for moving the same to opened and closed positions, and other valve means arranged in one of said chambers operable at times to permit the exhaustion of air therefrom into the atmosphere.

5. In air brake mechanism, a housing interposed between the air pipe line and the air brake mechanism, said housing being divided into a plurality of chambers, valve means for controlling communication between certain of said chambers, and pressure operable valve means arranged between certain others of the chambers for controlling and regulating communication therebetween, one of said certain other chambers and one of the first mentioned chambers being inter-communicating.

6. In air brake mechanism, a housing interposed between the air pipe line and the air brake mechanism, said housing being divided into a plurality of chambers, valve means between certain of said chambers for controlling communication therebetween at times, pressure operable valve means arranged between certain others of said chambers for establishing communication therebetween, said pressure operable means communicating with and being operable from one of the first mentioned chambers, and other valve means in one of said first mentioned chambers for controlling the exhaustion of air therefrom into the atmosphere at times.

7. Air brake control mechanism comprising a housing interposed in the air pipe line and adjacent the air brake mechanism, said housing being divided into a plurality of chambers, electrically operable valve means for controlling communication between certain of said chambers, pressure operable valve means arranged between certain others of said chambers for controlling the passage of air from one into the other, said pressure operable valve means communicating with and being operable from one of said first mentioned chambers, and electrically operable valve means arranged in one of said chambers for permitting the exhaustion of air therefrom into the atmosphere at times.

8. In air brake mechanism, a housing interposed between the air pipe line and the air brake cylinder, said housing being divided into a plurality of chambers, automatically operable valve means for controlling communication between certain of said chambers, a cylindrical sleeve interposed between certain others of said chambers having a plurality of graduated ports formed therein at different heights, a valve having ports formed in the same slidably received in said sleeve, said first mentioned ports communicating with one of the chambers, and the ports in said valve communicating with said first mentioned ports and with the opposite chamber, means for establishing communication between certain of said chambers, and pressure operable means in one of said chambers connected to said slidable valve.

9. In air brake mechanism, a housing interposed between the air pipe line and the air brake cylinder, said housing being divided into a plurality of chambers, automatically operable valve means for controlling communication between certain of said chambers, a sleeve interposed between certain other of said chambers, said sleeve having a plurality of graduated ports formed about the same at different heights and the lower end of said sleeve communicating with the adjacent chamber, a ported valve slidably received in said sleeve, means for establishing communication between certain of said first and second-mentioned chambers, pressure operable means in one of said chambers connected to said ported valve, and automatic valve means in another of said chambers for permitting the exhaustion of air therefrom into the atmosphere at times.

10. In air brake mechanism, a housing interposed between the air pipe line and the air brake cylinder, said housing being divided into a plurality of chambers, valve means for automatically establishing communication between certain of said chambers, a sleeve interposed between certain others of said chambers having a plurality of graduated ports formed in the same at different heights and communicating with one of the aforesaid chambers, the lower end of said sleeve communicating with the adjacent chamber, a ported valve slidably received in said sleeve adapted to have the ports thereof communicate at times with said graduated ports, a piston snugly received and mounted for movement in one of said chambers below said sleeve and connected to the valve therein, and other automatically operable valve means in one of said chambers for exhausting air therefrom into the atmosphere, at times.

11. In air brake mechanism, a housing interposed between the air pipe line and the air brake cylinder, said housing being divided into a plurality of chambers, automatically operable valve means between certain of said chambers for controlling communication therebetween, pressure operable valve means arranged between certain others of said chambers for controlling communication therebetween, certain of the chambers of the several group of chambers inter-communicating, and automatically operable valve means positioned adjacent the point of connection of the housing with the air pipe line operable with reduction of pressure thereto from said air pipe line to interrupt such communication.

12. In air brake mechanism, a housing interposed between the air pipe line and the air brake cylinder, said housing being divided into a plurality of chambers, automatically operable valve means for controlling communication between certain of said chambers, pressure operable valve means arranged between certain others of said chambers for controlling communication therebetween and with the air brake cylinder, certain of the chambers of said group of chambers inter-communicating, and other pressure operable valve means arranged in the housing adjacent its point of communication with the air pipe line operable with reduction of pressure thereonto from the air pipe line for interrupting communication as between such air pipe line and the housing, and other automatically operable valve means in one of said chambers for permitting the exhaustion of air therefrom into the atmosphere at times.

13. In air brake mechanism, a housing interposed between the air pipe line and the air brake cylinder, said housing being divided into a plurality of chambers, electrically operable valve means arranged between certain of said cylinders for controlling communication therebetween, a cylindrical sleeve arranged between certain others of said chambers having a plurality of graduated ports formed therein at different points about its peripheral surface communicating with one of said chambers and its lower end constricted and open and communicating with the adjacent chamber, a ported valve slidably received in said sleeve, a piston connected to said ported valve and workable in said adjacent chamber for transmitting motion to said valve at times, said adjacent chamber and another of the chambers inter-communicating, a pressure operable valve arranged in the housing adjacent its point of communication with the air pipe line and operable with the reduction of pressure thereonto from said air pipe line to interrupt communication as between such air pipe line and the housing, and other electrically operable valve means in one of said chambers for permitting the exhaustion of air therefrom into the atmosphere.

14. In air brake mechanism, a housing interposed between the air pipe line and the air brake cylinder, said housing being divided into a plurality of chambers, electrically operable valve means for controlling communication between certain of said cylinders, a sleeve interposed between certain others of said chambers having a plurality of relatively graduated ports formed at varied heights about its peripheral surface, said ports communicating with the upper chamber and the lower end of said sleeve communicating with the adjacent chamber, a ported valve slidably received in said sleeve, said adjacent chamber communicating with the air brake cylinder, a piston mounted for sliding movement in said adjacent chamber adapted to receive air pressure directed thereto from one of said other chambers, portions of the walls of the adjacent chambers having air escape ducts formed therein and communicating with the same at points above and below the normal positioning of said piston and with the atmosphere, another pressure operable valve in the housing adjacent its point of communication with the air pipe line operable with reduction of air pressure thereonto for interrupting communication between said air pipe line and the housing, and other electrically operable valve means in one of said chambers for permitting exhaustion of air therefrom into the atmosphere.

In witness whereof I have hereunto set my hand.

FRANK N. JOHNSTON.